United States Patent [19]
Hopkins

[11] Patent Number: 5,761,464
[45] Date of Patent: Jun. 2, 1998

[54] PREFETCHING VARIABLE LENGTH DATA

[75] Inventor: Charles H. Hopkins, Upton, Mass.

[73] Assignee: EMC Corporation, Hopkinton, Mass.

[21] Appl. No.: 447,088

[22] Filed: May 22, 1995

[51] Int. Cl.[6] .................................................. G06F 13/00
[52] U.S. Cl. .......................... 395/310; 711/171; 395/584
[58] Field of Search .................................. 395/308, 310, 395/584; 711/171

[56] References Cited

U.S. PATENT DOCUMENTS

| | | | |
|---|---|---|---|
| 4,422,070 | 12/1983 | Couper et al. | 340/723 |
| 4,489,378 | 12/1984 | Dixon et al. | |
| 4,499,535 | 2/1985 | Bachman et al. | |
| 5,111,425 | 5/1992 | Takeuchi et al. | 395/425 |
| 5,146,578 | 9/1992 | Zangenhpour | 395/425 |
| 5,179,663 | 1/1993 | Iimura | 395/250 |
| 5,293,609 | 3/1994 | Shih et al. | 395/425 |
| 5,404,474 | 4/1995 | Crook et al. | 395/400 |
| 5,440,687 | 8/1995 | Coleman et al. | 395/200.15 |
| 5,459,850 | 10/1995 | Clay et al. | 395/497.02 |
| 5,463,762 | 10/1995 | Morrissey et al. | 395/185.02 |
| 5,619,469 | 4/1997 | Katsuta | 395/405 |
| 5,659,713 | 8/1997 | Goodwin et al. | 395/484 |

*Primary Examiner*—Jack B. Harvey
*Assistant Examiner*—David A. Wiley
*Attorney, Agent, or Firm*—Fish & Richardson, P.C.

[57] ABSTRACT

An interface unit connected between a first bus and a second bus, the first bus having connected thereto a memory system and the second bus having connected thereto a plurality of devices which perform read operations directed at the memory system, the interface unit including a buffer memory having an input that is electrically coupled to the first bus for receiving data that is sent from the memory system over the first bus and an output that is electrically coupled to the second bus for delivering data to the second bus for transfer to a requesting device, the requesting device being one of the plurality of devices; a plurality of prefetch size registers equal in number to the plurality of devices, wherein each of the plurality of prefetch size registers stores a number for a different corresponding one of the plurality of devices, wherein the number stored in each of the plurality of prefetch size registers specifies an amount of data that is prefetched from memory in response to a data read request from the corresponding device; and a control unit which in response to a data read request from any one of the plurality of devices prefetches into the buffer a predetermined amount of data from the system memory, the predetermined amount being determined by the number stored in prefetch size register corresponding to the requesting device.

14 Claims, 2 Drawing Sheets

PREFETCHING VARIABLE LENGTH DATA

BACKGROUND OF THE INVENTION

The invention relates to an interface or bridge between two data buses that have different bandwidths or speeds.

A common architecture found in computer systems employs at least two buses, one of which is a system bus connected to system memory and the other of which is a input/output bus connected to an input/output (I/O) device. Typically, the system bus is a much faster bus than the I/O bus. That is, it can transfer data at a much higher rate than the I/O bus. The difference in speeds can result in operational inefficiencies. For example, when the I/O device requests data from system memory, the requested data is sent over the system bus to the I/O bus which then delivers it to the device. The I/O bus, however, cannot transfer data as fast as the system bus can deliver it. Thus, unless some mechanism for interfacing the two buses is provided, the system bus will not be able to operate at its maximum speed, rather it must operate at the speed of the I/O bus. As a consequence, the system bus will be tied up for a longer period of time than is necessary and the system bus bandwidth will not be fully utilized.

A technique that has been developed for handling such problems is referred to data prefetching. In general, an intermediate buffer is provided between the faster bus and the slower bus. The faster bus transfers a predetermined amount of data to the intermediate buffer at its high data transfer rate. That is, a predetermined amount of data is prefetched into the intermediate buffer. As soon as the prefetched data has been completely delivered to the intermediate buffer, the system bus can then be freed up to handle other tasks. In the meantime, the intermediate buffer delivers the prefetched data to the slower bus at a rate which is compatible with its slower speed. Thus, the intermediate buffer prevents the slower bus from tying up the bandwidth of the faster bus.

SUMMARY OF THE INVENTION

In general, in one aspect, the invention is an interface unit connected between a first bus and a second bus. A memory system is connected to the first bus and a plurality of devices which perform read operations directed at the memory system are connected to the second bus. The interface unit includes a buffer memory having an input that is electrically coupled to the first bus for receiving data that is sent from the memory system over the first bus and an output that is electrically coupled to the second bus for delivering data to the second bus for transfer to a requesting device. The interface unit also includes a control unit and a plurality of prefetch size registers equal in number to the plurality of devices. Each of the prefetch size registers stores a number for a different corresponding one of the devices. The number stored in each of the prefetch size registers specifies an amount of data that is prefetched from memory in response to a data read request from the corresponding device. The control unit responds to a data read request from any of the devices by prefetching from the system memory into the buffer a predetermined amount of data determined by the number that is stored in a prefetch size register corresponding to the requesting device.

In preferred embodiments, the interface unit includes a prefetch counter register. The control unit also includes an arbiter which arbitrates among data read requests from multiple devices to determine which data read request is granted. In response to a data read request from the requesting device, the control unit also loads the prefetch counter register with the number stored in the prefetch size register corresponding to the requesting device. The control unit then uses the contents of the prefetch counter to determine when the predetermined amount of data has been prefetched from the memory system. The control unit decrements the contents of the prefetch counter as the prefetched data is being received by the interface unit over the first bus.

The interface unit further includes an address register electrically coupled to the second bus. The address register receives and stores an address provided by the requesting device. The address identifies the location in the memory system of data that is being requested. During operation, the control unit increments the contents of the address register as the prefetched data is being received by the interface unit over the first bus.

In general, in yet another aspect, the invention is a method of prefetching data in a system including a first bus to which a memory system is connected and a second bus to which a plurality of devices are connected. The method includes the steps of: providing a plurality of prefetch size registers equal in number to the plurality of devices and each of which corresponds to a separate device; storing prefetch amounts in the prefetch registers, each prefetch amount being stored in a different corresponding one of the prefetch size registers; in response to receiving a data read request from one of the devices, reading the prefetch amount that is stored in the prefetch register which corresponds to the requesting device; prefetching a predetermined amount of data from the system memory over the first bus, the predetermined amount being equal in size to the prefetch amount for the requesting device; storing the prefetched data in a buffer; and transferring the prefetched data from the buffer to the requesting device over the second bus.

Preferred embodiments include the following steps. The method also includes providing a prefetch counter; in response to receiving the data read request from the requesting device, loading into the prefetch counter the number that is stored in the prefetch size register for the requesting device; and counting down the contents of the prefetch counter to determine when prefetched data of a sufficient amount has been prefetched from the system memory. The step of using the contents of the prefetch counter to establish the amount of data that is prefetched from said system memory includes the steps of: as prefetched data is being prefetched from the memory system, decrementing the contents of the prefetch counter; and when the contents of the prefetch counter equals a preselected number, terminating the prefetching of data from the memory system. The method further includes the steps of: providing an address register; and in response to receiving the data read request from the requesting device, loading the address register with an address provided by the requesting device, the step of prefetching data from system memory includes using the contents of the address register to identify locations of data being prefetched from system memory. The method also includes incrementing the contents of the address register as data is being prefetched from system memory.

Also in preferred embodiments, the method includes the steps of: performing a read operation over the second bus to obtain information about each of the devices attached to the second bus; and determining the prefetch amounts for each of the prefetch size registers from the information obtained for each of the devices. The method further includes providing a table mapping information about each of the plurality of devices to prefetch amounts and wherein the step of determining the prefetch amounts involves cross-referencing through the table. Each of the plurality of devices includes an internal buffer having a predetermined size and the prefetch amounts for each of the devices is equal to the size of the internal buffer for that device.

Data is prefetched at the memory bus speed and stored temporarily in a buffer memory in the interface. Once the prefetched amount of data is delivered, the system bus is released and made available for other use such as other data transfers. While the system bus is freed up for other operations, the prefetched data is shipped out over the slower second bus at the slower transfer rate. With the invention, the second bus is utilized at or near its maximum speed while the faster system bus is free a larger part of the time. Also, the invention results in fewer arbitration cycles and less overhead than is characteristic of alternative approaches. Thus, the invention makes more efficient use of the bandwidth of the slower second bus, as compared to conventional approaches. Also, because the prefetch is variable across the devices, this enables the user to tailor bus traffic for the particular set of devices that are connected to the second bus and to retailor the bus traffic for a new set of devices.

Other advantages and features will become apparent from the following description of the preferred embodiment and from the claims.

DESCRIPTION OF THE PREFERRED EMBODIMENTS

Structure

Figure 1:
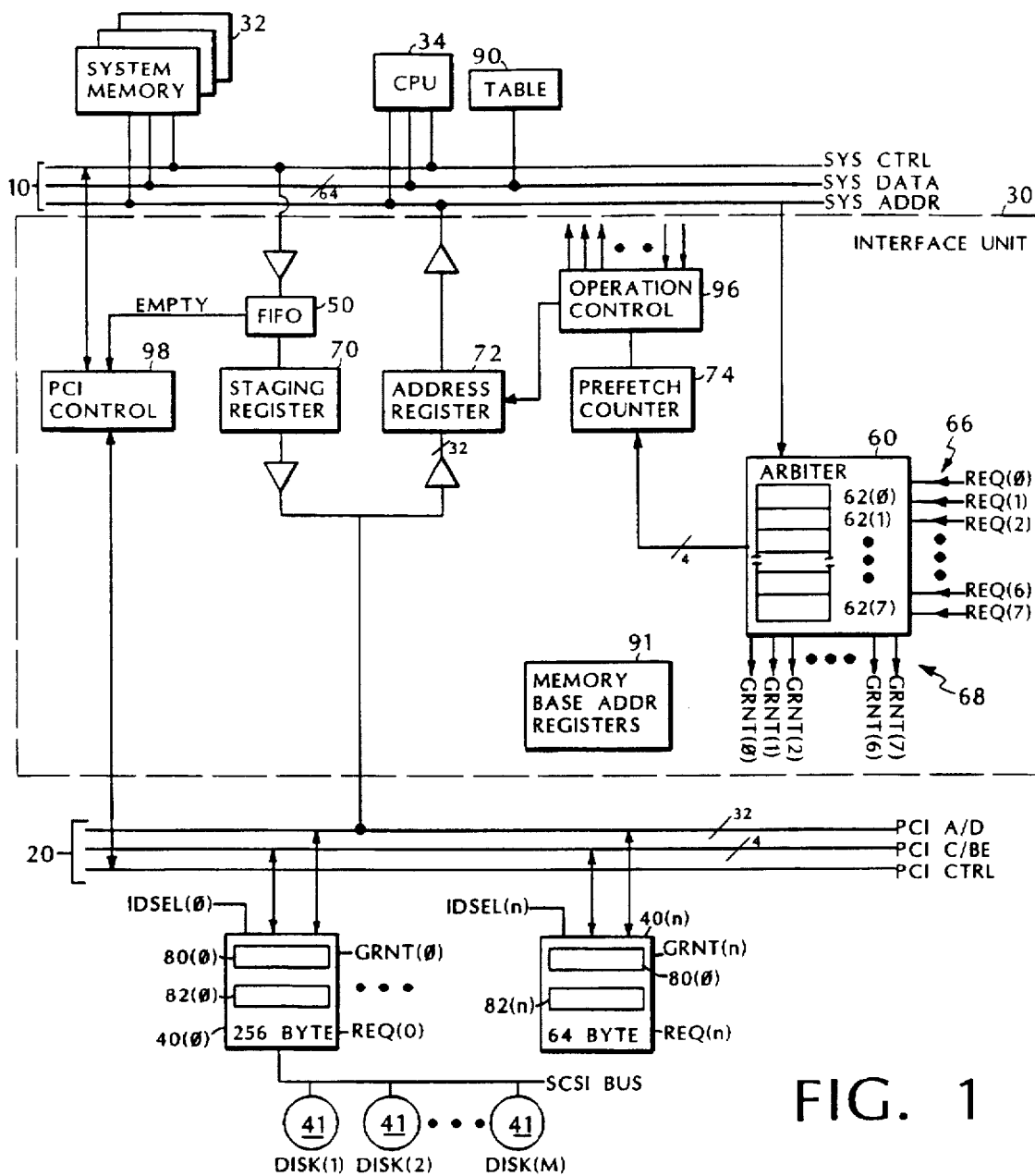
FIG. 1 is a block diagram of an embodiment of the invention including a system memory bus, a PCI bus and an interface unit interconnecting the two buses.

Referring to FIG. 1, a high speed system bus 10 is connected to a lower speed I/O bus 20 through an interface unit 30. A memory system 32 and a central processing unit (CPU) 34 are connected to system bus 10 and a plurality of devices 40(0)–40(n) are connected to I/O bus 20. Interface unit 30 includes a buffer 50 which in the described embodiment is a standard, 256 byte FIFO (first-in-first-out memory). Prefetched data from system memory 32 is transferred over high speed system bus 10 to interface unit 30 where it is temporarily stored in buffer 50 before it is then forwarded over the slower I/O bus 20 to the requesting device while system bus 10 is freed up to handle other traffic.

Interface 30 also includes an arbiter 60 which performs at least two important functions. First, when multiple devices simultaneously request access to system memory resources, it arbitrates those multiple requests to determine which of the requesting devices is to be granted access to the memory system. Second, when the requested access is a read from system memory, it specifies a device-specific number indicating the amount of data that may be prefetched from system memory for the requesting device.

To control device access to the bus, arbiter includes a set of request lines 66, REQ(0) to REQ(7), and a corresponding set of grant lines 68, GRNT(0) to GRNT(7). Each grant-request pair (e.g. the pair of lines labeled GRNT(0) and REQ(0)) connects to a corresponding device on I/O bus 20. The request and grant lines provide the mechanism by which devices obtain access to the bus. The device requests access to the bus to which it is attached by asserting a signal on the arbiter's request line. This signal is detected by the arbiter which then determines which of the requesting devices, assuming that other devices are also requesting access at the same time, will be give ownership of the bus. When the arbiter grants the device access to the bus, it notifies the selected device by asserting a signal on its grant line for that device. The arbiter cannot assert more than one grant at a time.

In the described embodiment, the arbitration scheme is a simple round robin scheme. The arbiter maintains a cyclical counter (not shown) which contains the number of the device that has priority, i.e., the device that will be given a grant if it has requested one at that time. After a grant is given or if the device which has priority has not requested a grant within a predetermined period of time, the arbiter increments the counter to the next device number. After the number in the counter reaches nine, the counter goes back to zero in response to the next increment. Of course, the round robin approach is merely illustrative and it should be understood that another arbitration scheme could have been used.

Inside arbiter 60 there is a set or file of prefetch size registers 62(0)–62(7), one for each of the eight devices that may be connected to the I/O bus (referred to generally as prefetch size registers 62). Prefetch size registers 62 store device-specific numbers which identify the amounts of data that are prefetched from system memory when the corresponding device performs a read operation on a part of memory that permits a prefetch operation. Typically this number is different for each device. In the described embodiment, the number reflects the amount of data the device can receive at one time, which may be dictated by the size of an internal buffer 80 within the requesting device. Note that it is generally not known, a priori, how much data the device will ultimately want transferred to it. Thus, in this particular implementation, it is assumed that the device will want at least as much data as its internal buffer will hold. It should be understood, however, that the device-specific number need not necessarily reflect internal buffer size. It may reflect or take into account other device characteristics or it may be selected on the basis of other considerations. The important point is that the number can vary from device to device.

System bus 10 includes control lines (labeled SYS CTRL), 64 data lines (labeled SYS DATA), and address lines (labeled SYS ADDR). System bus 10 operates in accordance with a modified version of the IBM/Motorola Power PC 603 system bus protocol. To improve performance, in the described embodiment the protocol has been modified by adding a feature referred to herein as streaming mode. This feature is activated by a stream mode signal.

When the memory system is operating in a streaming mode, it sends a continuous, uninterrupted stream or sequence of 32 bit data words until streaming mode is terminated. Streaming mode is invoked by asserting a streaming mode signal to system memory 32. When the streaming mode signal is asserted and a memory address from a device is supplied to system memory, there is a short latency period while the memory system responds to the data request, and then it begins sending a sequence of 64 bit words, one word every clock cycle, until one block of data has been sent (i.e., 32 bytes of data). If the requester places an address for the next block of data onto the address lines while the streaming mode signal remains asserted, the memory system continues sending 64 bit words for the next block. As long as the requester continues sending new block addresses to the memory system as each block is received and as long as the streaming mode signal remains asserted, the memory system will continue sending 64 bit words of data back to the requester. This streaming process is terminated when the streaming mode signal is deasserted.

Streaming mode helps achieve a very high utilization of the available bandwidth on the system bus. In the described embodiment, the system bus is capable of sustaining a data rate of about 400–500 MB/sec. in streaming mode.

I/O bus 20 operates in accordance with the PCI (Peripheral Component Interconnect) standard that was promulgated by Intel Corporation of California. I/O bus 20 will be referred to hereinafter as PCI bus 20. PCI bus 20 includes 32 address/data lines (labeled PCI A/D), 4 command and byte enable lines (labeled C/BE), and control lines (labeled CTRL). PCI bus 20 is a 33 MHZ bus. Since the A/D portion of the bus is 32 bits wide, this means that the bus can theoretically handle a maximum data rate of about 133 MBytes/sec. Typical performance, however is usually significantly below this.

According to the PCI standard, a PCI bus is able to support a maximum load of ten devices. In the described embodiment, PCI bus 20 is designed to accept a maximum of eight devices. The devices that are attached to the PCI bus typically include, for example, a SCSI bus interface, an Ethernet interface card, a fiber channel link, and graphics controller boards, just to name a few. In the embodiment shown in FIG. 1, device(0) is a SCSI interface chip to which are connected a number of disk controllers 41.

The PCI standard specifies that all devices that are connected to the PCI bus must have configuration registers which can be read and written to at power up time. In FIG. 1 the configuration registers are labeled 82(0) . . . 82(n) and will be referred to hereinafter generally as configuration registers 82. Each set of configuration registers 82 stores a manufacturer's code and a device type code. In addition, there is a special type of PCI bus cycle, namely a configuration cycle which is distinct from a read or a write cycle, during which configuration registers 82 are read. Each device has an IDSEL pin which is used during the configuration cycle to select the device which is the target of the configuration cycle. A particular device is selected by asserting a signal on its IDSEL pin. The IDSEL signal can be generated by any appropriate mechanism. For example, a common PCI method for generating the IDSEL signal is through an address bit on the PCI bus.

A configuration cycle is required for each of the devices attached to the PCI bus. By learning the manufacturer's code and the device type code during a configuration cycle, one can immediately determine many characteristics of the device that is attached to the bus, including the size of its internal buffer. A table 90 mapping the manufacturer's code and device type code to internal buffer size and possibly other characteristics is kept on the system where it is accessible to the CPU. A simple lookup using that table produces the number that is stored in the corresponding prefetch size register 62. During system initialization, which occurs at power up or at a system reset, CPU 34 interrogates each device and then loads each prefetch size register 62 with a number from table 90 indicating how many blocks of data (each block containing 32 bytes) may be prefetched from system memory 32 for the corresponding device 40 during a system memory read operation.

In general, when a device wants to perform a read operation over the PCI bus, the procedures are as follows. To gain access to the PCI bus the device asserts a request signal on its request line. The request remains asserted until it gets granted by the arbiter. The grant signal then remains asserted until a device asserts a FRAME control signal goes on marking the start of a data transfer. The FRAME control signal remains on throughout the entire length of the PCI cycle. When a device receives a grant signal, it waits for the bus to become idle and then it puts an address onto the PCI bus address/data lines and asserts a FRAME control signal. If another device asserts a request in the middle of a transfer and gets a grant from the arbiter, the arbiter maintains that grant until the FRAME control signal goes away, one or two idle cycles have passed, and the granted device asserts a FRAME control signal, at which point the arbiter removes the grant. An asserted grant signal means that if the bus is idle, then at the next clock tick, the device that has its grant signal asserted can place an address onto the address/data lines of the PCI bus, assert a FRAME signal, and then proceed with data transfer over the PCI bus. In other words, for a device to start driving the PCI bus, the device must have asserted a request, there must be a grant to that device from the arbiter, and the bus must be idle.

Interface unit 30 also includes a staging register 70, an address register 72, and a prefetch counter register 74. Staging register 70 receives each word of data that is being transferred out of buffer 50 for transmission to the requesting device over PCI bus 20. Data from buffer 50 is held in register 70 while it is being applied to the address/data lines of the PCI bus and while it is being read by the requesting device. Using a logic gate array (not shown), the interface unit translates the address on the address/data lines of the PCI bus into a system memory address of the location within system memory 32 of the beginning of the block of data that is being requested. After translation, the interface unit stores the system memory address in address register 72. Simultaneously, prefetch counter register 74 is loaded with a number representing the number of blocks of data that are to be transferred (i.e., prefetched) from system memory to buffer 50 in response to the request from a device on the PCI bus. Prefetch counter register is also used to keep track of the number of blocks that remain to be transferred from system memory during the transfer of blocks to buffer 50.

It should be noted in regard to this particular embodiment which uses a PCI bus that according to the PCI specification there are two types of system memory, namely, prefetchable and non-prefetchable. The prefetch operations of more than one block can be directed only to the prefetchable portions of memory. The interface unit contains a set of memory base address registers 91 which identify the portions of system memory that are prefetchable and the portions that are non-prefetchable. The interface unit checks these base address registers 91 before performing a prefetch operation. If the read operation is directed to the portion of system memory that is prefetchable, then the interface unit prefetches the number of blocks that are indicated in the appropriate one of the prefetch size registers. On the other hand, if the read operation is directed to the portion of system memory that is non-prefetchable, then the interface unit prefetches only one block of data. This is an implementation detail that is particular to the PCI specification. If another protocol is used that does not have that restriction, then, of course, the amount of prefetched data would be determined entirely by the contents of the prefetch size registers.

The operation of the interface unit is controlled by an operation control unit 96 and a PCI control unit 98. Operation control unit 96 implements the protocol for accessing and communicating over the system bus and it handles the internal operation of the interface unit. As noted above, the protocol that is used in the described embodiment is the IBM/Motorola Power PC 603 Bus protocol, however, it can be any appropriate protocol for communicating over a system bus. PCI control unit 98, which is a commercially available unit, implements the PCI protocol for accessing and communicating over the PCI bus.

Operation

At power up, CPU 34 does a reference through interface 30 out onto PCI bus 20 to read the device configuration registers 82. Using table 90, CPU 34 looks up the charactertistics of the connected device (e.g. internal buffer size) and then performs a write cycle on the system bus that is destined for the corresponding prefetch register to program it with the number of blocks which are to be prefetched for the device.

A power up routine which is executed during power up includes a section of code which performs the required number of configuration cycles to obtain the device-specific information from all devices locations on the PCI bus. This code section knows how many devices can be connected to the bus and it requests that information regardless of whether an actual device is connected. That is, the CPU asserts, one at a time, the IDSEL signal for each device location on the PCI bus even though no device may be attached. Thus, if a maximum of eight devices may be attached to the bus, as is the case for the PCI bus in the described embodiment, the CPU runs eight sets of configuration cycles (i.e., more than one configuration cycle is required for each device). If the configuration cycle is addressed to a location on the bus at which no device is attached, there will be no response received from the configuration cycle within a predefined timeout period and the CPU will move onto the next device location. By running a separate configuration cycle for each device, the CPU steps through all of the devices attached to the bus and programs the corresponding prefetch size register in the arbiter with the appropriate number of blocks from table 90.

With the prefetch size registers all programmed with the appropriate numbers, the arbiter is now ready to select the size of the prefetch operation that will be performed for each device requesting a read operation on system memory.

To illustrate the operation of the interface unit, a prefetch operation will now be described for one of the devices on the PCI bus, namely, device(1). Assume that device(1) has an internal buffer which allows it to request 256 bytes of data. Thus, during system initialization the CPU will have loaded the number eight into the prefetch size register for that device, meaning that the amount of data that will be prefetched from system memory for that device will be eight blocks, or equivalently, 256 bytes.

When a device wants to perform a read operation on system memory, it asserts a signal on its request line. If the requesting device has priority over the other devices that are connected to the PCI bus, or if no other devices have made a similar request, the arbiter grants the request by asserting a signal on the corresponding grant line for that device. The arbiter also points into the set of prefetch size registers and forces the contents of appropriate prefetch size register into prefetch counter register 74.

In response to the grant signal, the requesting device provides an address to the PCI address lines. PCI control unit 98 knows from a FRAME control signal that the device asserts on the PCI control bus that the device has placed an address on the PCI address bus. The FRAME control signal notifies operation control unit 96 that an address is available to be loaded into the address register. The operation control unit then translates the address on the PCI bus and loads it into the address register.

The operation control unit 96 then makes a request over the system bus for a data transfer from system memory. When that request is granted, control unit 96 puts out the address stored in the address register onto the system ADDR bus and it asserts the stream mode signal. This starts the flow of data back over the system data bus to the buffer in the interface at the rate of 64 bits per cycle. The operation control knows how many cycles it takes to transfer a complete block of data (i.e., four 64 bit words). When the operation control unit determines that the buffer has received an entire block of data, it decrements the prefetch counter, it increments the address register by a block length of address, and presents the new address to the memory system. This causes the data transfer to continue in streaming mode.

This process of decrementing the prefetch register and incrementing the address register by a blocks length continues until the prefetch counter register indicates that only one more block remains to be transferred. At that point, the operation control unit deasserts the stream mode signal on the system bus. This terminates the streaming mode and after the last block is received, the transfer of data from the system memory halts.

As soon as the last block of prefetched data has been received from system memory, the operation control unit forces a disconnect from the system bus so that so other devices can have access to it.

The data that arrives at the input side of buffer 50 falls through the buffer. As soon as the PCI control unit detects that data is available at the output side of the buffer (e.g. as indicated by a change in state of the signal on an empty line 71 on buffer 50), it enables the process of transferring the data over the PCI bus to the requesting device. The data flows out of buffer 50 into staging register 70 from which it is applied to the address/data lines of PCI bus 20. As long as buffer 50 is not empty and as long as the device is in control and wants data, the PCI control unit keeps enabling 32 bit words of data from buffer 50 to be sent to the device over the PCI bus, one word each clock cycle. As soon as buffer 50 goes empty, which occurs when the last 32 bit word leaves buffer 50 and passes into staging register 50, it sends an empty signal to the PCI control unit which in turn performs a disconnect on the requesting device thereby freeing up the PCI bus for other devices. If the device which requested data still wants additional data, it has to issue a new request and then wait until it receives a new grant signal.

Figure 2:
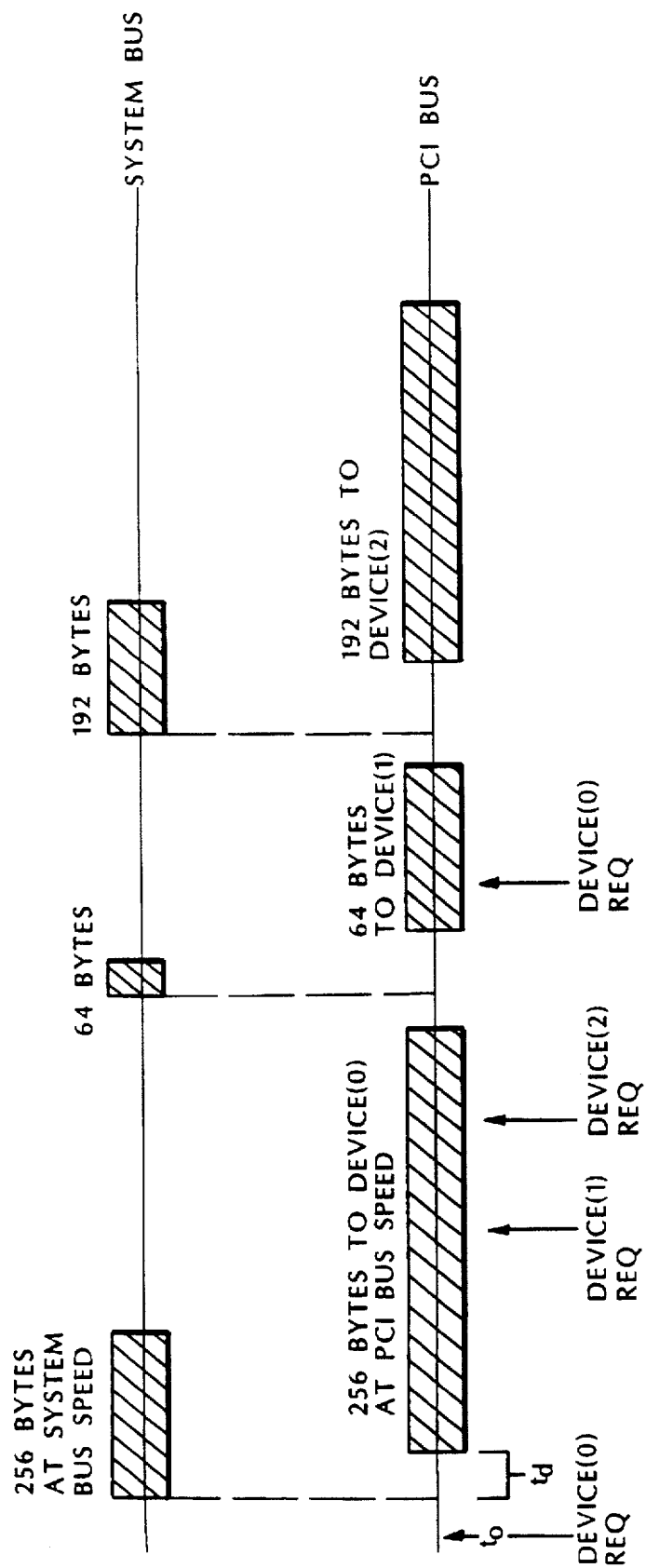
FIG. 2 is a timing diagram illustrating the operation of the embodiment shown in FIG. 1.

The relative timing of the data transfers which over the two buses is illustrated in FIG. 2. The top line in FIG. 2 shows activity over the system bus and the bottom line shows activity over the PCI bus. Note that device(0) requests access to system memory at time $t_0$. If no other requests were pending from other devices or if device(0) has priority over requests from other devices, device(0) receives a grant from the arbiter. In response to receiving its grant, it places an address onto the PCI address/data lines and that address is loaded into the address register 72 within the interface unit. The arbiter also loads a block count from the prefetch size register for device(0) into its prefetch counter register. In this case, the loaded block count is 8 since device(0) has a 256 byte internal buffer. When the interface unit gets access to the system memory over the system bus, the interface unit asserts the streaming mode signal and forces the address from its internal address register 72 onto the system bus address lines. This causes the system memory to start sending data to the interface unit where it is stored in the buffer 50 prior to transfer to device(0) over the PCI bus. The interface unit increments the address that is sent to the system memory by a block length each time a complete block is received and until the appropriate number of blocks of data has been received (i.e., 8 blocks). Then, the interface unit forces a disconnect from the system bus freeing it up for use by other resources.

The interface unit starts to send the data over the PCI bus to the device as soon as it is available from the buffer. There is a short delay (e.g. $t_d$) sufficient to allow the incoming data to fall through the FIFO and for the PCI control unit to recognize that data is available for transfer to the requesting device. After that delay data becomes available at the output of the FIFO and it is sent to the requesting device at the PCI bus speed.

If device(1) has generated a request while the data is being sent to device(0) or if device(1) has a request pending, the arbiter within the interface unit issues a grant to device(1) which then waits until the PCI bus enters an idle state. When the idle state occurs (i.e., when the transfer to device(0) is complete), device (1) takes control of the PCI bus. Then the same sequence of events takes place for device(1). In the case of device(1), however, it is assumed that its internal buffer will only hold 64 bytes. The block count that is loaded into the prefetch counter register is 2.

If device(0) again requests more data from system memory, its request will only be granted if no higher priority device has also made a request. In the illustrated example, it is indicated that device(2) has made a request prior to the second request by device(0). Thus, device(2) will be given access to system memory before device(0) is again allowed to have access.

As can be seen in the top line of FIG. 2, the system bus is freed up during much of the time that the PCI bus is occupied transferring prefetched data to the requesting device at its much slower rate.

In the above description it was assumed that the prefetch size was determined by the device's internal buffer size. It should be understood, however, that this need not be the case. The important feature is simply that the amount that is prefetched varies depending upon the device that is making the request for data. Moreover, the prefetch size could vary dynamically. In addition, in the described embodiment, a disconnect from the PCI bus occurs after the contents of the buffer inside the interface unit have been transferred to the requesting device thus requiring that the device make another request for access to the bus. Alternatively, the device can be allowed to stay connected to the PCI bus for a longer period of time so that multiple prefetch amounts can be transferred.

Also it should be noted that the streaming mode that was described above is not a necessary feature of the invention. Even without a streaming mode capability, the variable prefetch size offers advantages in performance over systems that are not do not implement a variable prefetch size.

The invention has wide applicability beyond the specific embodiment described above. It can be used in any system in which devices (e.g. disk interface units, fiber optic links, etc.) that are connected to a slower bus request large data transfers from a memory that is connected to a faster bus.

Other embodiments are within the following claims.
What is claimed is:

1. An interface unit connected between a first bus and a second bus, said first bus having connected thereto a memory system and said second bus having connected thereto a plurality of devices which perform read operations directed at said memory system, said interface unit comprising:

a buffer memory having an input that is electrically coupled to the first bus for receiving data that is sent from said memory system over said first bus and an output that is electrically coupled to said second bus for delivering data to said second bus for transfer to a requesting device, said requesting device being one of said plurality of devices;

a plurality of prefetch size registers equal in number to said plurality of devices, wherein each of said plurality of prefetch size registers stores a number for a different corresponding one of said plurality of devices, wherein the number stored in each of said plurality of prefetch size registers specifies an amount of data that is prefetched from memory in response to a data read request from the corresponding device; and a control unit which in response to a data read request from any one of said plurality of devices prefetches into said buffer a predetermined amount of data from said system memory, said predetermined amount being determined by the number stored in the prefetch size register corresponding to the requesting device.

2. The interface unit of claim 1 further comprising a prefetch counter register, wherein in response to a data read request from said requesting device said control unit loads said prefetch counter register with the number stored in the prefetch size register corresponding to the requesting device and wherein said control unit uses the contents of said prefetch counter to determine when the predetermined amount of data has been prefetched from said memory system.

3. The interface unit of claim 2 wherein said control unit decrements the contents of said prefetch counter in response to the prefetched data being received by said interface unit over the first bus.

4. The interface unit of claim 3 wherein said control unit comprises an arbiter which arbitrates among data read requests from said plurality of devices to determine which data read request is granted.

5. The interface unit of claim 2 further comprising an address register electrically coupled to the second bus, said address register receiving and storing an address provided by the requesting device, said address identifying the location in the memory system of data.

6. The interface unit of claim 5 wherein the control unit increments the contents of the address register as the prefetched data is being received by said interface unit over the first bus.

7. A method of prefetching data in a system including a first bus to which a memory system is connected and a second bus to which a plurality of devices are connected, said method comprising:

providing a plurality of prefetch size registers equal in number to said plurality of devices, each of said prefetch size registers corresponding to a different one of said devices;

storing a plurality of prefetch amounts in said plurality of prefetch registers, each prefetch amount of said plurality of prefetch amounts being stored in a different corresponding one of said prefetch size registers;

in response to receiving a data read request from one of said plurality of devices, reading the prefetch amount that is stored in the prefetch register which corresponds to the requesting device;

prefetching a predetermined amount of data from said system memory over the first bus, said predetermined amount being equal in size to the prefetch amount for the requesting device;

storing the prefetched data in a buffer; and transferring the prefetched data from the buffer to the requesting device over the second bus.

8. The method of claim 7 further comprising:

providing a prefetch counter;

in response to receiving said data read request from the requesting device, loading into said prefetch counter the number that is stored in the prefetch size register for the requesting device; and using the contents of said prefetch counter to establish when prefetched data of a sufficient amount has been prefetched from said system memory.

9. The method of claim 8 wherein the step of using the contents of said prefetch counter to establish the amount of data that is prefetched from said system memory comprises:

as prefetched data is being prefetched from the memory system, decrementing the contents of the prefetch counter; and when the contents of said prefetch counter equals a preselected number, terminating the prefetching of data from said memory system.

10. The method of claim 8 further comprising:

providing an address register; and in response to receiving said data read request from the requesting device, loading said address register with an address provided by the requesting device, wherein the step of prefetching data from system memory comprises using the contents of the address register to identify locations of data being prefetched from system memory.

11. The method of claim 10 further comprising incrementing the contents of the address register as data is being prefetched from system memory.

12. The method of claim 7 further comprising:

performing a read operation over the second bus to obtain information about each of said plurality of devices attached to the second bus; and determining the prefetch amounts for each of said prefetch size registers from the information obtained for each of said plurality of devices.

13. The method of claim 12 further comprising:

providing a table mapping information about each of said plurality of devices to prefetch amounts; wherein the step of determining the prefetch amounts comprises cross-referencing through said table.

14. The method of claim 13 wherein each of said plurality of devices includes an internal buffer having a predetermined size and wherein the prefetch amounts for each of said devices is equal to the size of the internal buffer for that device.

* * * * *